United States Patent [19]

Gardos et al.

[11] Patent Number: 5,710,602
[45] Date of Patent: Jan. 20, 1998

[54] GAIN CORRECTION FOR ENCODING VIDEO IMAGES

[75] Inventors: Thomas R. Gardos, Portland, Oreg.; Joe Monaco, Atlanta, Ga.

[73] Assignee: Intel Corporation, Santa Clara, Calif.

[21] Appl. No.: 536,619

[22] Filed: Sep. 29, 1995

[51] Int. Cl.$^6$ .............................. H04N 5/228; H04N 9/75
[52] U.S. Cl. ........................ 348/586; 348/591; 348/255; 348/672
[58] Field of Search .................... 348/672, 673, 348/208, 229, 255, 587, 592, 591, 580

[56] References Cited

U.S. PATENT DOCUMENTS

| | | | |
|---|---|---|---|
| 4,811,084 | 3/1989 | Belmares-Sarabia et al. | 358/22 |
| 4,837,632 | 6/1989 | Kubo et al. | 348/208 |
| 5,107,293 | 4/1992 | Sekine et al. | 348/208 |
| 5,198,896 | 3/1993 | Kondo et al. | 348/208 |
| 5,384,595 | 1/1995 | Sakaguchi | 348/208 |
| 5,400,081 | 3/1995 | Chaplim | 348/587 |

OTHER PUBLICATIONS

"A Method for Removing Background Regions from Moving Images," authors Tsuyoshi Fujimoto, Mineo Shoman and Masahiko Hase, SPIE vol. 1606, Visual Communications and Image Processing '91: Image Processing, pp. 599–606.

"Approaches to Static Background Identification and Removal," authors A.J. Shelley and N.L. Seed, 1993 The Institution of Electrical Engineers, Printed and Published by the IEE, Savoy Place, London WC2R OBL.UK, pp. 6/1–6/4.

"Bayesian Block–Wise Segmentation of Interframe Differences in Video Sequeses," authors Ken Sauer and Coleen Jones, CVGIP: Graphical Moedels and Image Processing, vol. 55, No. 2, Mar., pp. 129–139, 1993.

"Image Processing Techniques for Illunication Correction," author John W.V. Miller, SPIE vol. 956 Pierce Recognition and Image Processing (1988), pp. 18–25.

"Moving Object Recognition Using an Adaptive Background Memory," authors Klaus–Peter Karmann and Achim von Brandt, Time–Varying Image Processnig and Moving Object Recognition, 2–edited by V. Cappellini, Elsevier Science Publishers B.V., 1990, pp. 289–296.

"A Background Updating Algorithm for Moving Object Scenes" authors Serio Brofferio, Leonarda Carnimeo, Domenico Comunale and Giuseppe Mastronardi, Time–Varying Image Processing and Moving Object Recognition, 2, edited by V. Cappellini, Elsevier Science Publishers B.V., 1990, pp. 297–307.

"Motion Field Estimators and their Application to Image Interpolation", by S. Tubaro and F. Rocca, pp. 152–187; 1993.

*Primary Examiner*—Glenton B. Burgess
*Attorney, Agent, or Firm*—William H. Murray; N. Stephan Kinsella

[57] ABSTRACT

A background region of the current image is compared to a reference region to characterize the gain associated with the current image. The values of the unsaturated background pixels of the current image are then adjusted to correct for the characterized gain before encoding the current image. In a preferred embodiment, the reference region is generated based on the previous n frames in the video sequence.

18 Claims, 12 Drawing Sheets

FIG. 1. ENCODING SYSTEM

FIG. 3. GAIN CORRECTION

FIG. 4. GAIN CORRECTION

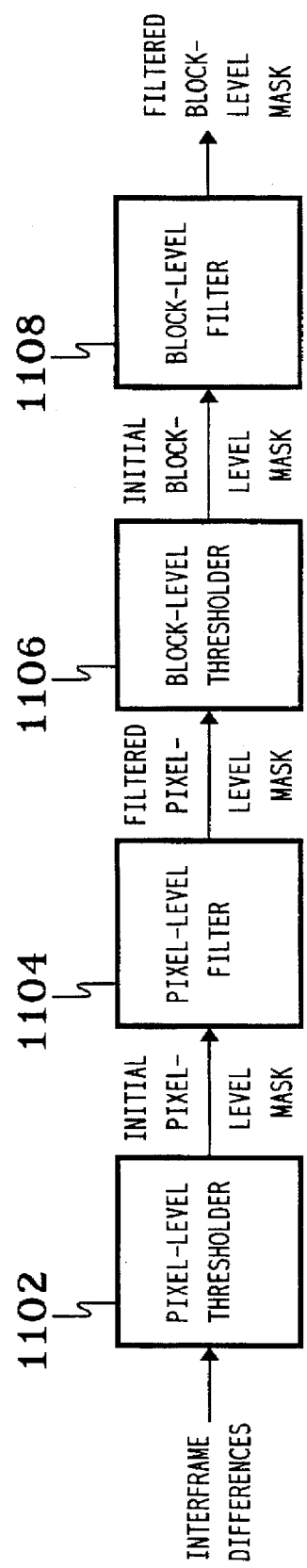
FIG. 11. FOREGROUND/BACKGROUND SEGMENTATION

FIG. 12.  FOREGROUND/BACKGROUND SEGMENTATION
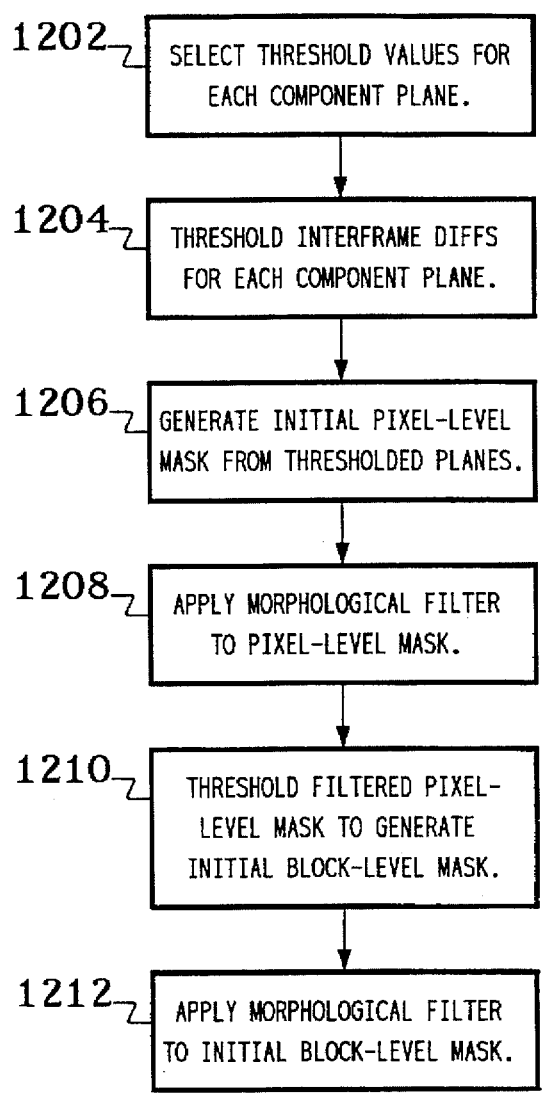

GAIN CORRECTION FOR ENCODING VIDEO IMAGES

BACKGROUND OF THE INVENTION

1. Field of the Invention

The present invention relates to image processing, and, in particular, to encoding video images.

2. Description of the Related Art

In teleconferencing applications, video sequences typically consist of a two distinct layers: a background layer and a foreground layer. The background layer consists of the static objects in the scene that ideally should be coded and sent to the receiver only once. Conversely, the foreground layer consists of objects that move and change shape as time progresses. By concentrating bit allocation on pixels in the foreground layers, more efficient video encoding can be achieved. To achieve this goal, some video coders perform foreground/background segmentation to determine which portions of the video images correspond to foreground and which to background. In general, background regions correspond to portions of the scene that do not significantly change from frame to frame.

Accurate foreground/background segmentation can be thwarted when the video images are generated by a video camera that performs automatic gain control (AGC). AGC is performed to ensure that the subject (i.e., a foreground object) falls well within the dynamic range of the camera. Unfortunately, AGC causes interframe differences to occur in regions that are spatially static (e.g., background regions). This can result in undesirable increases in the bitrate. It can also lead to misidentification of background regions as being part of the foreground.

What is needed is a video encoding scheme that addresses the bitrate and foreground/background segmentation problems created by using video cameras with automatic gain control.

It is accordingly an object of this invention to overcome the disadvantages and drawbacks of the known art and to provide an improved scheme for encoding video streams generated by video cameras operating with automatic gain control.

Further objects and advantages of this invention will become apparent from the detailed description of a preferred embodiment which follows.

SUMMARY OF THE INVENTION

The present invention comprises a computer-implemented process, an apparatus, and a storage medium encoded with machine-readable computer program code for encoding images. According to a preferred embodiment, a background region of a current image of a video stream is selected and a reference region is generated corresponding to the background region. Gain of the current image is characterized based on the reference region and the background region and a gain-corrected image is generated by correcting the current image based on the gain. The gain-corrected image is then encoded.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 11 is a block diagram of a system for performing foreground/background segmentation, according to a preferred embodiment of the present invention; and FIG. 12 is a flow diagram of the processing implemented by the foreground/background segmentation system of FIG. 11.

DESCRIPTION OF THE PREFERRED EMBODIMENT(S)

The present invention is directed to video encoding systems that correct for the gain associated with video cameras that perform automatic gain control. The gain-corrected images are then analyzed to identify blocks that correspond to scene foreground and those that correspond to scene background. This foreground/background segmentation may be used to determine how to encode the image. The segmentation results may also be used during the gain correction processing of subsequent video frames.

SYSTEM HARDWARE ARCHITECTURES

Figure 1:
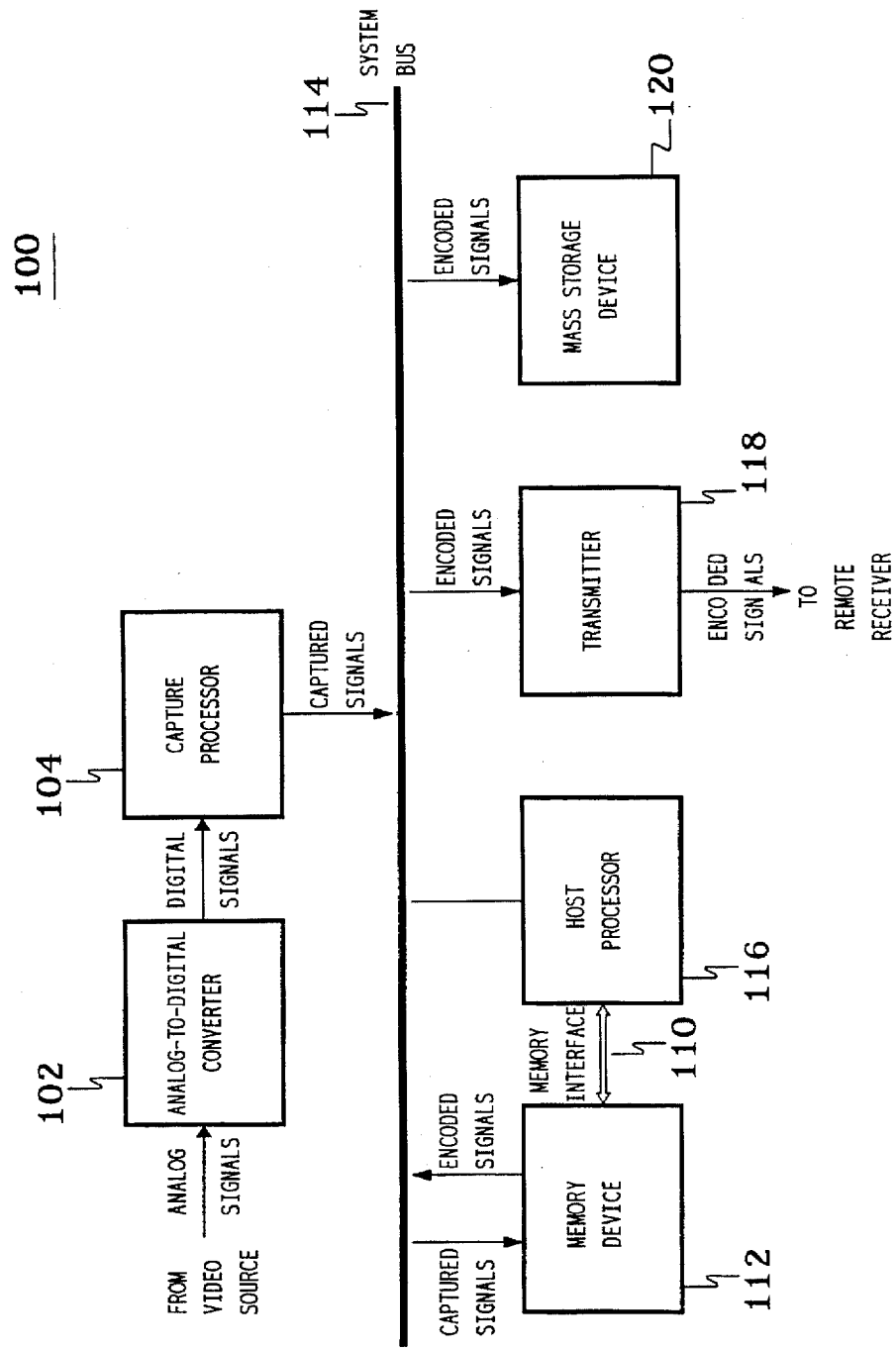
FIG. 1 is a block diagram of a video system for encoding video signals in a PC environment, according to a preferred embodiment of the present invention.

Referring now to FIG. 1, there is shown a computer system 100 for encoding video signals, according to a preferred embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 decodes (i.e., separates the signal into constituent components) and digitizes the analog video signals into digital video component signals (e.g., in one embodiment, 8-bit R, G, and B component signals).

Capture processor 104 captures the digitized component signals received from converter 102. Capturing may include one or more of color conversion (e.g., RGB to YUV), scaling, and subsampling. Each captured video frame is represented by a set of three two-dimensional component planes, one for each component of the digitized video signals. In one embodiment, capture processor 104 captures video signals in a YUV9 (i.e., YUV 4:1:1) format, in which every (4×4) block of pixels of the Y-component plane corresponds to a single pixel in the U-component plane and a single pixel in the V-component plane. Capture processor 104 selectively stores the captured signals to memory device 112 and/or mass storage device 120 via system bus 114.

Those skilled in the art will understand that, for real-time encoding, the captured signals are preferably stored to memory device 112, while for non-real-time encoding, the captured signals are preferably stored to mass storage device 120.

During real-time encoding, host processor 116 reads the captured bitmaps from memory device 112 via high-speed memory interface 110 and generates encoded video signals that represent the captured video signals. Depending upon the particular encoding scheme implemented, host processor 116 applies a sequence of compression steps to reduce the amount of data used to represent in the information in the video signals. The encoded video signals are then stored to memory device 112 via memory interface 110. and/or mass storage device 120 via system bus 114. Host processor 116 may copy the encoded video signals to mass storage device 120 and/or transmit the encoded video signals to transmitter 118 for real-time transmission to a remote receiver (not shown in FIG. 1).

Figure 2:
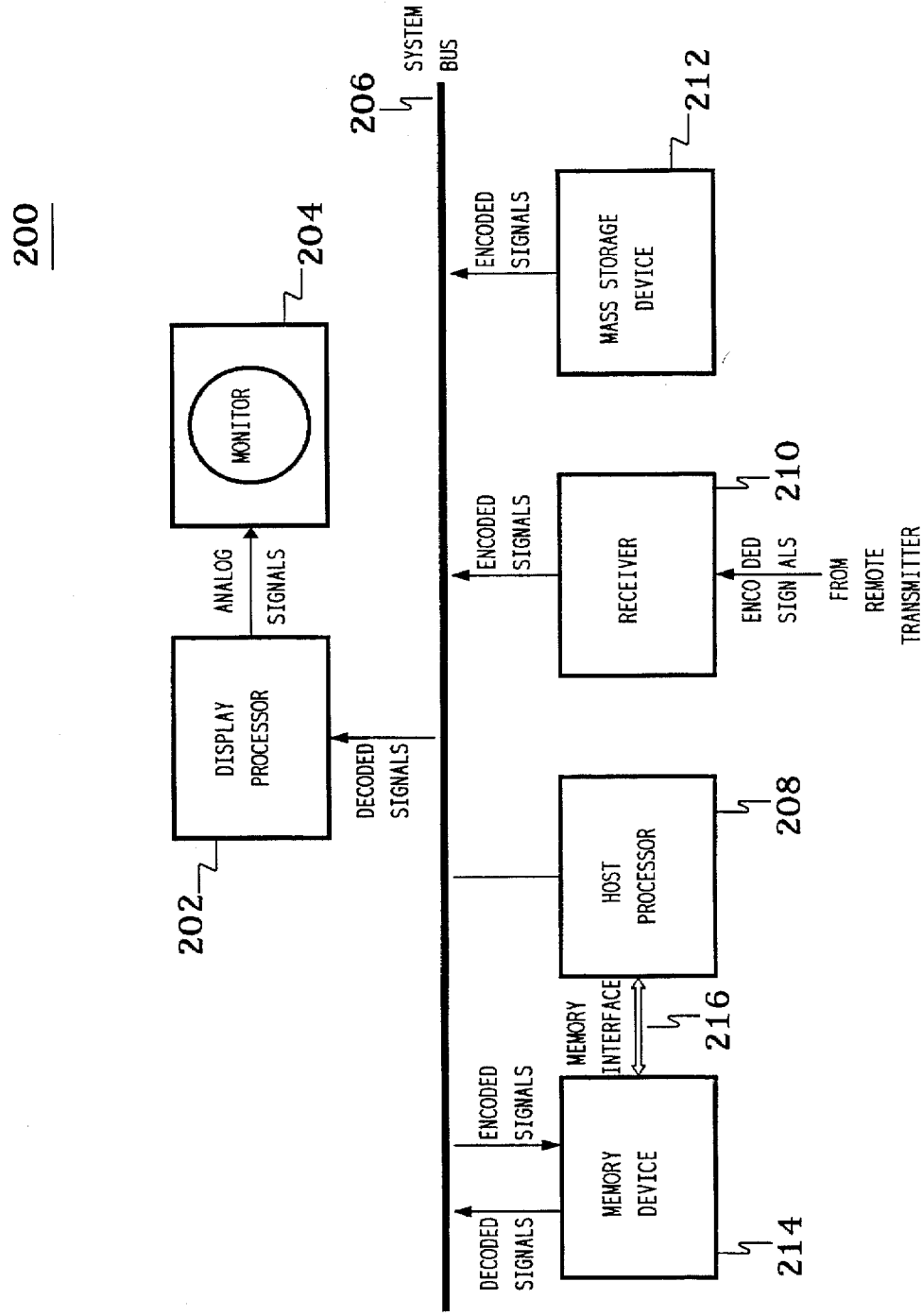
FIG. 2 is a computer system for decoding the video signals encoded by the computer system of FIG. 1, according to a preferred embodiment of the present invention.

Referring now the FIG. 2, there is shown a computer system 200 for decoding the video signals encoded by encoding system 100 of FIG. 1, according to a preferred embodiment of the present invention. Encoded video signals are either read from mass storage device 212 of decoding system 200 or received by receiver 210 from a remote transmitter, such as transmitter 118 of FIG. 1. The encoded video signals are stored to memory device 214 via system bus 206.

Host processor 208 accesses the encoded signals stored in memory device 214 via high-speed memory interface 216 and decodes the encoded video signals for display. Decoding the encoded video signals involves undoing the compression processing implemented by encoding system 100 of FIG. 1. Host processor 208 stores the decoded video signals to memory device 214 via memory interface 216 from where they are transmitted to display processor 202 via system bus 206. Alternatively, host processor 208 transmits the decoded video signals directly to display processor 202 via system bus 206. Display processor 202 processes the decoded video signals for display on monitor 204. The processing of display processor 202 includes digital-to-analog conversion of the decoded video signals. After being decoded by host processor 208 but before being D/A converted by display processor 202, the decoded video signals may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digitized video component signals as subsampled frames. In a preferred embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 is preferably an Intel® general-purpose microprocessor such as an Intel® i486™, Pentium™, or higher processor. System bus 114 may be any suitable digital signal transfer device and is preferably a Peripheral Component Interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital signals and is preferably a computer hard drive. Transmitter 118 may be any suitable means for transmitting digital signals to a remote receiver. Those skilled in the art will understand that the encoded video signals may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding encoded video signals and is preferably an Intel® general purpose microprocessor such as an Intel® i486™, Pentium™, or higher processor. System bus 206 may be any suitable digital signal transfer device and is preferably a PCI bus. Mass storage device 212 may be any suitable means for storing digital signals and is preferably a CD-ROM device or a hard drive. Receiver 210 may be any suitable means for receiving the digital signals transmitted by transmitter 118 of encoding system 100. Display processor 202 may be any suitable device for processing video signals for display (including converting the digital video signals to analog video signals) and is preferably implemented through a PC-based display system such as a VGA or SVGA system. Monitor 204 may be any means for displaying analog signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video signals. Those skilled in the art will understand that such a combined system may be used to display decoded video signals in real-time to monitor the capture and encoding of video signals.

In alternative embodiments of present invention, the video encode processing of an encoding system and/or the video decode processing of a decoding system may be assisted by a pixel processor, such as an Intel® i750PE™ processor, or other suitable component(s) to off-load processing from the host processor by performing computationally intensive operations.

GAIN CORRECTION

Background regions are typically defined as those regions with relatively small interframe differences from frame to frame. Automatic gain control presents problems for foreground/background segmentation. A slight change in gain may produce a relatively large amount of energy in the difference image, which may lead to incorrect classification of a large area of an image as foreground. Since a goal of the present invention is to code only those areas of the scene composed of foreground objects, misclassifying spatially static regions as foreground would have an adverse affect on achieving that goal.

To address the problems caused by automatic gain control, the present invention preferably performs gain correction. Gain correction involves two general steps: (1)

characterizing the gain associated with the current image and (2) correcting for that estimated gain.

The gain for the current image is characterized by comparing pixels of the current image that are part of the image background to a set of reference pixels. In a preferred embodiment of the present invention, a particular (16×16) macroblock of the image is selected for use in characterizing gain. For example, in video conferencing, where the paradigm is a "talking head" on a static background, a macroblock in the upper left corner of the frame may be initially selected as being part of the image background for use in characterizing gain.

The set of reference pixels (i.e., the reference macroblock) is preferably generated from the corresponding macroblocks of the most recent frames. For example, the reference macroblock may be generated by averaging the corresponding pixels from the n previous frames. That is, pixel (0,0) of the reference macroblock is the average of the (0,0) pixels from the corresponding macroblocks of each of the n previous frames. In this embodiment, the n previous frames are buffered for use in updating the reference macroblock for each new frame. Alternatively, the reference macroblock can be updated without retaining the actual frame data for the n previous frames. For example, the pixels of the reference macroblock may be updated according to the following formula:

$$g_{i+1} = \frac{n-1}{n} g_i + \frac{1}{n} f_i \quad (1)$$

where n is the number of frames used to generate the reference macroblock, $g_{i+1}$ is a pixel of the reference macroblock for the next frame, $g_i$ is the corresponding pixel of the reference macroblock for the current frame, and $f_i$ is the corresponding pixel of the current frame. The reference macroblock may be generated using other techniques as well, e.g., the median of the last n frames.

If it is determined (e.g., during foreground/background segmentation) that the reference macroblock does not correspond to the background regions of the frame, then another macroblock (e.g., the upper right corner of the frame) may be selected for use in generating the reference macroblock.

In one embodiment, the gain factor α for the current frame is characterized using to the following equation:

$$\alpha = \frac{\Sigma f[x]g[x]}{\Sigma f^2[x]} \quad (2)$$

where:
o g[x] are the pixels of the reference macroblock; and
o f[x] are the pixels of the macroblock of the current frame corresponding to the reference macroblock.

In another embodiment, the gain factor α is estimated using the following equation:

$$\alpha = \frac{\Sigma g[x]}{\Sigma f[x]} \quad (3)$$

Equation (2) gives the minimum mean square error (MMSE) estimate of the gain, while Equation (3) calculates the gain with parameters that may already be known in the encoder. In any case, since no multiplications are involved, Equation (3) is computationally simpler than Equation (2).

Background areas that are saturated high are preferably not used to calculate the gain factor α. Likewise, areas with very low illumination levels (i.e., saturated low) will tend to underestimate the gain because of the inherent quantization involved in producing a digital image. As such, background pixels that do not fall within specified upper and lower threshold values are preferably not used to generate the gain factor α.

Estimation of α using either Equations (2) or (3) requires knowledge of where the background is located in the current frame. Thus, gain correction and background detection are dependent functions. A priori knowledge about the scene or prediction based on past statistics is used to estimate initially either α or the background areas. Blocks near the border of the image that have remained part of the background for a number of previous frames can serve as an adequate starting point for estimating α.

After the gain factor α is estimated, the current image is corrected for gain by multiplying the pixels of the current image by α. In a preferred embodiment, only those pixels that are part of background regions are corrected for gain. Moreover, gain correction is not applied in saturated regions (either high or low) of the background.

Figure 3:
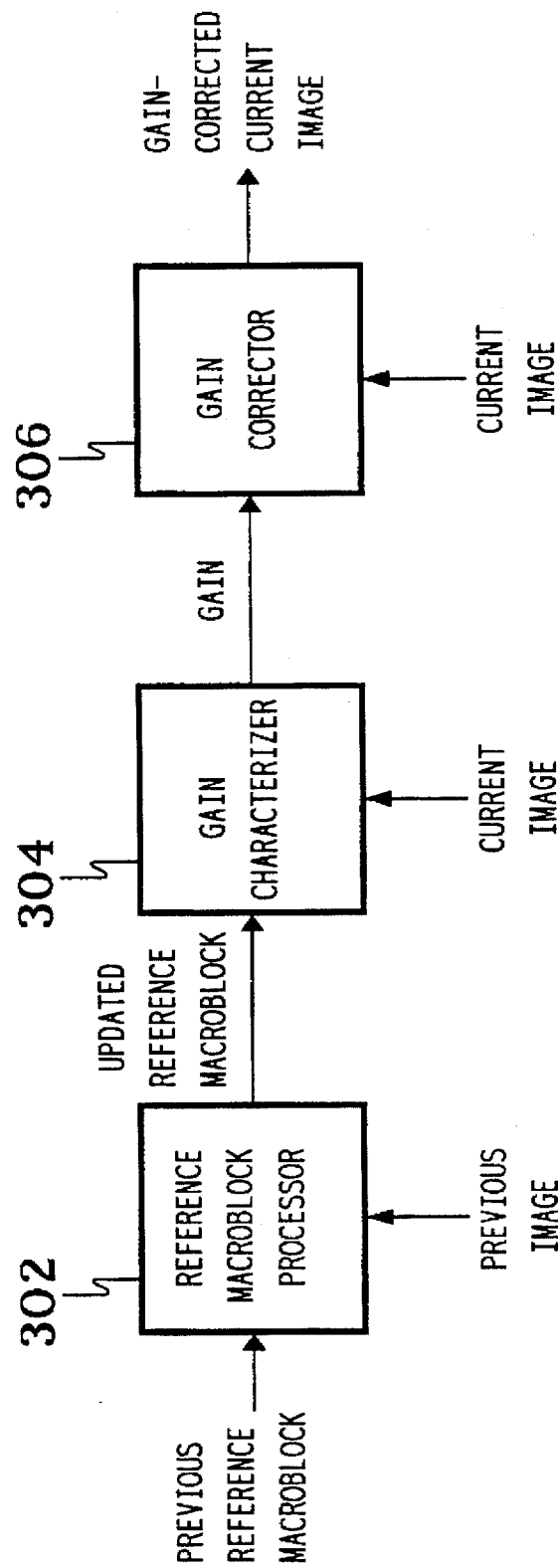
FIG. 3 is a block diagram of a system for correcting gain, according to a preferred embodiment of the present invention.

Referring now to FIG. 3, there is shown a block diagram of a system for correcting gain, according to a preferred embodiment of the present invention. Reference macroblock processor 302 uses the previous reference macroblock and the previous image to generate an updated (or new) reference macroblock. Gain characterizer 304 uses the updated reference macroblock and the current image to characterize the gain associated with the current image. Gain corrector 306 uses the characterized gain to apply gain correction to the appropriate pixels of the current image to generate a gain-corrected current image.

Figure 4:
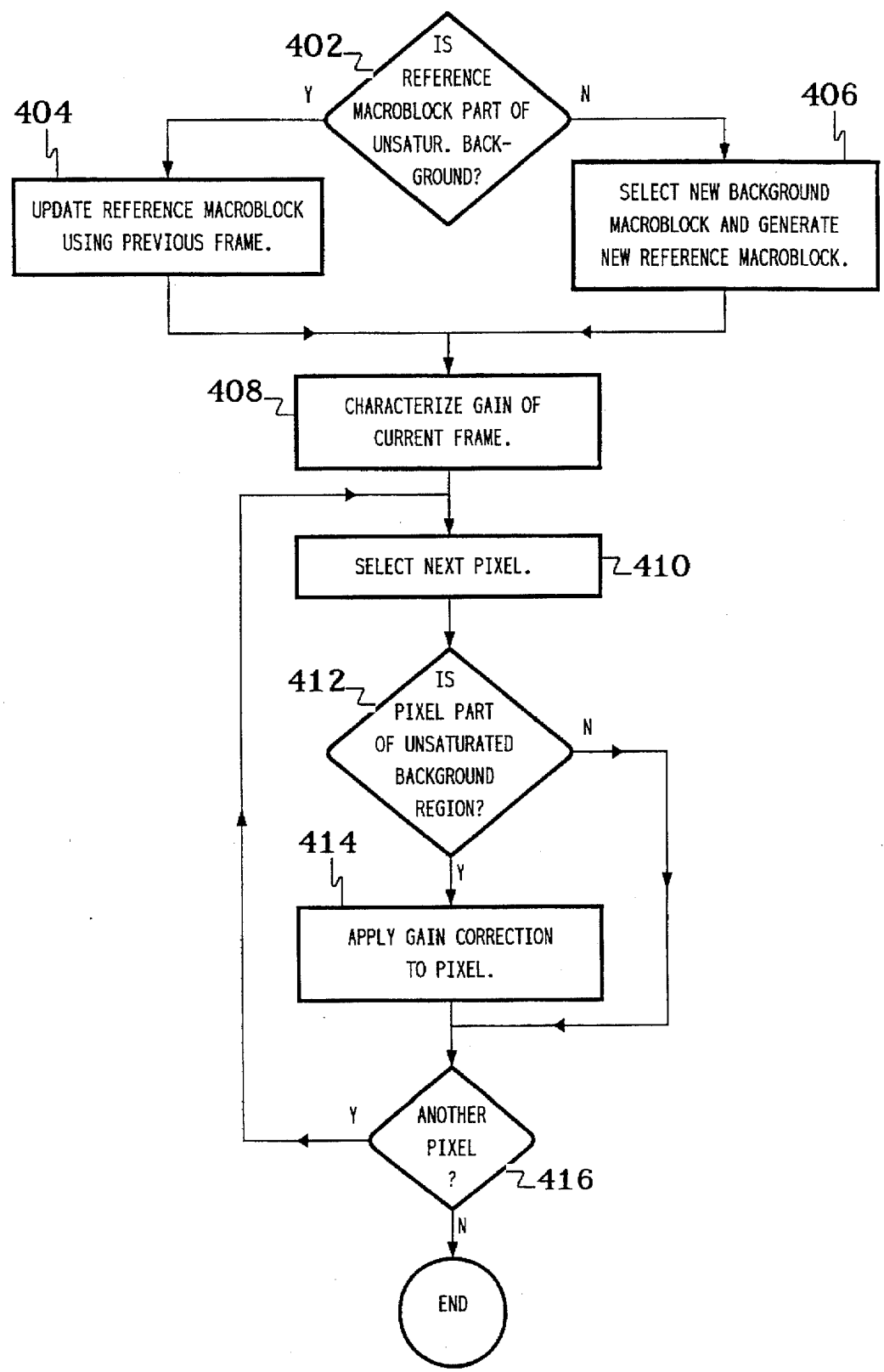
FIG. 4 is a flow diagram of the processing performed by the gain-correction system of FIG. 3.

Referring now to FIG. 4, there is shown a flow diagram of the processing performed by the gain-correction system of FIG. 3, according to a preferred embodiment of the present invention. If the reference macroblock continues to correspond to an unsaturated background region of the scene (step 402 of FIG. 4), then the updated reference macroblock is generated from the previous reference macroblock and the previous frame (step 404). Otherwise, the reference macroblock no longer corresponds to a region that may be used to characterize gain. In that case, a new unsaturated background macroblock is selected and used to generate a new reference macroblock (step 406).

After the reference macroblock has been either updated or generated anew, the reference macroblock and the corresponding macroblock of the current frame are used to characterize the gain associated with the current frame, using either Equation (2) or (3) (step 408).

After the gain has been characterized, steps 410 and 416 combine to sequentially select all of the pixels of the current frame. If the current pixel is part of an unsaturated background region (step 412), then gain correction is applied (step 414). Otherwise, the current pixel is either a saturated pixel (either high or low) or part of a foreground region or both. In those cases, gain correction is not applied and the pixel retains its original value.

By correcting for the effects of automatic gain control, the present invention provides robust segmentation of an image into foreground/background regions. This gain correction also increases the likelihood that motion estimates correspond to the true motion in the scene. The present invention attempts to normalize camera gain in the background and acquire a nearly complete estimate of the background layer over time. This background estimate can then be used to segment each layer into foreground/background regions.

FOREGROUND/BACKGROUND SEGMENTATION

After correcting for gain, foreground/background segmentation is performed to identify foreground and background regions of the current image. Segmentation analysis can be performed at different resolutions (i.e., granularities).

Pixel-based segmentation has the advantage of following the boundaries of foreground objects more closely than block-based segmentation. Some disadvantages of simple pixel-based techniques are that connectivity is not encouraged and it does not fit easily into the framework of a block-based coding algorithm. The connectivity problem can be addressed by incorporating information from neighboring pixels into the classification process at each pixel. In a preferred embodiment of the present invention, the ultimate goal is to incorporate the segmentation information into a block-based compression scheme. Thus, the preferred segmentation process results in a block-wise separation of each image into foreground/background regions.

The segmentation analysis of the present invention has a pixel level and a block level. At the pixel level, pixel differences between the current frame and a reference frame are thresholded for each frame to yield a pixel mask indicating changed pixels. The block level takes the pixel-level results and classifies blocks of pixels as foreground or background. The basis for classification is the assumption that significantly changed pixels should occur only in the foreground objects.

PIXEL LEVEL

Thresholding is used to identify changed pixels in each image plane. In one embodiment, a threshold is generated by considering a maximum likelihood estimate of changed regions. Every pixel in each image belongs to one of the following two sets: H0 (background pixels) and H1 (non-background or foreground pixels). For each location j, let pixel difference $d_j = p_j - b_j$, where $p_j$ is the pixel value at position j and $b_j$ is the reference value at position j. The reference values $b_j$ are part of a reference frame. The reference frame is preferably generated from the previous n frames using the same technique employed in generating the reference macroblock for gain correction, as described in the previous section.

For pixels in set H0, $d_j$ is expected to be a zero-mean Gaussian-distributed random variable. For pixels in set H1, $P_j$ and $b_j$ are assumed to be independent random variables uniformly distributed between 0 and 255. These assumptions yield the following equations:

$$p(d_j|j \in H0) = \frac{1}{\sqrt{2\Pi} \; \sigma} \exp\left(\frac{-d_j^2}{2\sigma^2}\right) \quad (4)$$

and $$p(d_j|j \in H1) = \frac{\left(1 - \frac{|d_j|}{255}\right)}{255} \quad (5)$$

where $p(d_j|j \in H0)$ is the probability that $d_j$ can take on a certain value given that the pixel at location j is part of the background and $p(d_j|j \in H1)$ is the probability that $d_j$ can take on a certain value given that the pixel at location j is part of the foreground. Simplifying the log likelihood ratio for these distributions and assuming that the numerator of Equation (5) is equal to 1 yields the following equation:

$$|d_j| \overset{j \in H1}{\underset{>}{}} \sqrt{2\sigma^2 \log\left[\frac{255}{\sqrt{2\Pi} \; \sigma} * \frac{Pr(j \in H0)}{1 - Pr(j \in H0)}\right]} \quad (6)$$

where $Pr(j \in H0)$ is the probability that the pixel at location j is part of the background. If $\sigma$ is selected to be 3 pixel intensity levels and if $Pr(j \in H0)$ is assumed to be 0.5, the Equation (6) reduces to the following relation:

$$|d_j| \overset{j \in H1}{\underset{>}{}} \sqrt{2(3)^2 \log\left[\frac{255}{\sqrt{2\Pi} \; (3)} * \frac{1 - (0.5)}{(0.5)}\right]} = 7.96 \quad (7)$$

That is, if the pixel difference $d_j$ for the pixel at location j has a value of 8 or more, then the pixel is said to be part of the foreground. Otherwise, the pixel is said to be part of the background.

The choice for $Pr(j \in H0)$ depends on how the background pixels $b_j$ are selected. In one embodiment, $b_j$ are the pixels of the previous frame. In this case, $Pr(j \in H0)$ would be close to 1. In another embodiment, a good background estimate is used and $Pr(j \in H0)$ is closer to 0.5 in typical video sequences. The threshold value generated using Equation (6) may be made temporally adaptive by updating the choice for $Pr(j \in H0)$ based on the foreground/background segmentation results for the previous frames. For example, the number of blocks identified as background in the previous frame relative to the total number of blocks per frame could be used as an estimate of the probability that a pixel of the current frame is a part of the background.

A threshold is computed for each component plane in the image and the pixel differences for each component plane are thresholded using the corresponding threshold value. An initial pixel-level mask is formed by ORing the thresholded planes. The initial pixel-level mask is a binary mask having a one-to-one correspondence between the mask elements and the pixels of the original image. A mask element is 1 if any of the pixel differences for the components of the corresponding image pixel are greater than the corresponding thresholds. Otherwise, the mask element is 0.

After the initial pixel-level mask is generated, a morphological filter is applied to decrease false foreground detections which tend to occur along stationary edges. If $M_p$ is the initial pixel-level mask, then a preferred morphological filter is given by the following equation:

$$M_p' = [M_p * h] \geq 4 \quad (8)$$

wherein $M_p'$ is the filtered mask, "*" denotes convolution, and:

$$h = \begin{bmatrix} 0 & 1 & 0 \\ 1 & 2 & 1 \\ 0 & 1 & 0 \end{bmatrix} \quad (9)$$

According to Equation (8), if the result of applying matrix h to a (3×3) portion of the initial pixel-level mask $M_p$ greater than or equal to 4, then the corresponding filtered element of the filtered pixel-level mask $M_p'$ is set to 1 to indicate that the filtered element is part of the foreground. Otherwise, the corresponding filtered element in the filtered pixel-level mask is set to 0 to indicate that the filtered element is part of the background. The morphological filter of Equation (8) forces isolated foreground pixels to the background and isolated background pixels to the foreground.

Figure 5:
FIG. 5 is an example of an original image.
Figure 6:
FIG. 6 is an initial pixel-level mask corresponding to FIG. 5.
Figure 7:
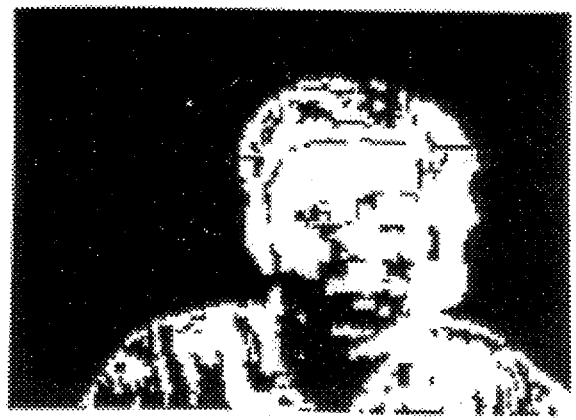
FIG. 7 is a filtered pixel-level mask corresponding to FIG. 6.

Referring now to FIGS. 5, 6, and 7, there are shown, respectively, an example of an original image, an initial pixel-level mask generated by thresholding the original image of FIG. 5, and a filtered pixel-level mask generated by applying the morphological filter of Equation (8) to the initial pixel-level mask of FIG. 6.

BLOCK LEVEL

At the block level, each block of elements of the filtered pixel-level mask is thresholded to determine whether the block corresponds to a foreground block or a background block. This thresholding step involves adding up the number of elements of the block of the filtered pixel-level mask that correspond to the foreground (i.e., have a value of 1) and then comparing that sum to a specified threshold. If the number of foreground elements in the block is greater than the specified threshold, then the block is said to be a foreground block. Otherwise, the block is said to be a background block. The result of this thresholding step is an initial block-level mask. Each element of the initial block-level mask corresponds to a block of elements of the filtered pixel-level mask and therefore to a block of pixels of the original image. The initial block-level mask is a binary mask, such that an element of the initial block-level mask having a value of 1 corresponds to a foreground block, while an element having a value of 0 corresponds to a background block. Experimental results indicate that, for an (N×N) block, the threshold value should lie between N/4 and N.

At the block level, it is also desirable to have a solid foreground mask. Unfortunately, when the background is not precisely known, holes tend to occur in the interior of slowly moving smooth foreground objects. To reduce the number of holes in the foreground, a morphological operator is applied to the initial block-level mask. For an initial block-level mask denoted $M_b$, a preferred morphological operator is described by the following equation:

$$M_b' = M_b \cup [(M_b * h_v) \geq 2] \cup [(M_b * h_h) \geq 2] \quad (10)$$

where $M_b'$ is the filtered block-level mask, "*" denotes convolution, $\cup$ designates the "union" or "OR" operation, $$h_v = \begin{bmatrix} 1 \\ 2 \\ 1 \end{bmatrix} \quad (11)$$

and $$h_h = \begin{bmatrix} 1 & 2 & 1 \end{bmatrix} \quad (12)$$

According to Equation (10), if an element of the initial block-level mask $M_b$ is 1, or if either of the two corresponding matrix products is two or more, then the corresponding element of the filtered block-level mask $M_b'$ is set to 1 to indicate that the pixel is part of the foreground. Otherwise, the corresponding element in the filtered block-level mask $M_b'$ is set to 0 to indicate that the pixel is part of the background. The morphological operation of Equation (10) tends to close small holes in the foreground. The filtered block-level mask indicates which blocks of the original image are part of the foreground and which are part of the background. This information can then be used to determine how to distribute the processing resources (e.g., computation time and bitrate) to encode the blocks of the current image.

Figure 8:
FIG. 8 is another example of a filtered pixel-level mask.
Figure 9:
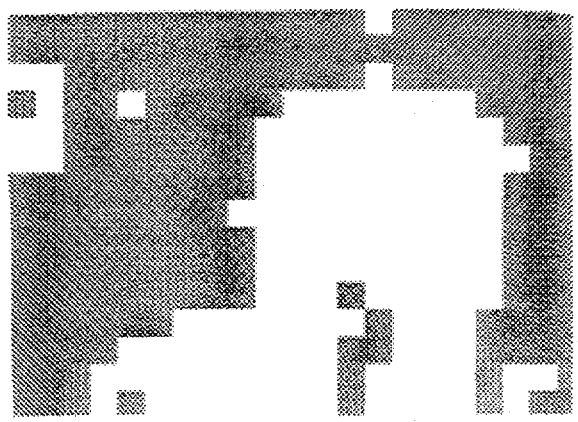
FIG. 9 is an initial block-level mask corresponding to FIG. 8.
Figure 10:
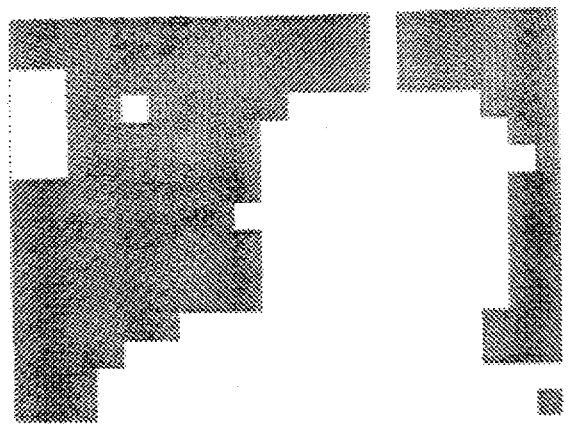
FIG. 10 is a filtered block-level mask corresponding to FIG. 9.

Referring now to FIGS. 8–10, there are shown, respectively, another example of a filtered pixel-level mask, an initial block-level mask generated by thresholding the filtered pixel-level mask of FIG. 8, and a filtered block-level mask generated by applying the morphological filter of Equation (10) to the initial block-level mask of FIG. 9.

Referring now to FIG. 11, there is shown a block diagram of a system for performing foreground/background segmentation, according to a preferred embodiment of the present invention. Pixel-level thresholder 1102 thresholds the original image to generate the initial pixel-level mask. Pixel-level filter 1104 applies the morphological filter of Equation (8) to the initial pixel-level mask to generate the filtered pixel-level mask. Block-level thresholder 1106 thresholds the filtered pixel-level mask to generate the initial block-level mask. Block-level filter 1108 applies the morphological filter of Equation (10) to the initial block-level mask to generate the filtered block-level mask.

Referring now to FIG. 12, there is shown a flow diagram of the processing implemented by the foreground/background segmentation system of FIG. 11, according to a preferred embodiment of the present invention. A threshold value is selected for each component plane of the current image (step 1202 of FIG. 12). The selected threshold values are then used to threshold the interframe differences for each component plane (step 1204). The initial pixel-level mask is then generated by ORing the thresholded planes together (step 1206). Under this embodiment, a pixel will be designated as being part of the foreground in the initial pixel-level mask if any of the interframe differences for its components exceed the corresponding threshold value. The morphological filter of Equation (8) is then applied to the initial pixel-level mask to generate the filtered pixel-level mask (step 1208).

The filtered pixel-level mask is then thresholded to generate the initial block-level mask (step 1210). The morphological filter of Equation (10) is then applied to the initial block-level mask to generate the filtered block-level mask (step 1212).

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for processing video signals, comprising the steps of:

(a) selecting a background region of a current image of a video stream;

(b) generating a reference region using regions corresponding to background regions of one or more images of the video stream;

(c) characterizing gain of the current image based on the reference region and the background region; and (d) generating a gain-corrected image by correcting the current image based on the gain.

2. The process of claim 1, further comprising the step of encoding the gain-corrected image to generate compressed data for the current image.

3. The process of claim 1, wherein step (c) comprises the step of characterizing the gain α, wherein:

$$\alpha = \frac{\Sigma f[x]g[x]}{\Sigma f^2[x]}$$

wherein:

g[x] are the pixels of the reference region; and f[x] are the pixels of the background region.

4. The process of claim 1, wherein step (c) comprises the step of characterizing the gain α, wherein:

$$\alpha = \frac{\Sigma g[x]}{\Sigma f[x]}$$

wherein:

g[x] are the pixels of the reference region; and f[x] are the pixels of the background region.

5. The process of claim 1, wherein step (d) comprises the step of skipping foreground pixels in the current image.

6. The process of claim 5, wherein step (d) comprises the step of skipping saturated background pixels in the current image.

7. An apparatus for processing video signals, comprising:

(a) means for selecting a background region of a current image of a video stream;

(b) means for generating a reference region using regions corresponding to background regions of one or more images of the video stream;

(c) means for characterizing gain of the current image based on the reference region and the background region; and (d) means for generating a gain-corrected image by correcting the current image based on the gain.

8. The apparatus of claim 7, wherein further comprising means for encoding the gain-corrected image to generate compressed data for the current image.

9. The apparatus of claim 7, wherein means (c) characterizes the gain α, wherein:

$$\alpha = \frac{\Sigma f[x]g[x]}{\Sigma f^2[x]}$$

wherein:

g[X] are the pixels of the reference region; and f[x] are the pixels of the background region.

10. The apparatus of claim 7, wherein means (c) characterizes the gain α, wherein:

$$\alpha = \frac{\Sigma g[x]}{\Sigma f[x]}$$

wherein:

g[x] are the pixels of the reference region; and f[x] are the pixels of the background region.

11. The apparatus of claim 7, wherein means (d) skips foreground pixels in the current image.

12. The apparatus of claim 11, wherein means (d) skips saturated background pixels in the current image.

13. A storage medium encoded with machine-readable computer program code for processing video signals, wherein, when executed by a computer, the computer program code causes the computer to:

(a) select a background region of a current image of a video stream;

(b) generate a reference region using regions corresponding to background regions of one or more images of the video stream;

(c) characterize gain of the current image based on the reference region and the background region; and (d) generate a gain-corrected image by correcting the current image based on the gain.

14. The apparatus of claim 13, wherein the computer program code causes the computer to encode the gain-corrected image to generate compressed data for the current image.

15. The apparatus of claim 13, wherein the computer program code causes the computer to characterize the gain α, wherein:

$$\alpha = \frac{\Sigma f[x]g[x]}{\Sigma f^2[x]}$$

wherein:

g[x] are the pixels of the reference region; and f[x] are the pixels of the background region.

16. The apparatus of claim 13, wherein the computer program code causes the computer to characterize the gain α, wherein:

$$\alpha = \frac{\Sigma g[x]}{\Sigma f[x]}$$

wherein:

g[x] are the pixels of the reference region; and f[x] are the pixels of the background region.

17. The apparatus of claim 13, wherein the computer program code causes the computer to skip foreground pixels in the current image.

18. The apparatus of claim 17, wherein the computer program code causes the computer to skip saturated background pixels in the current image.

* * * * *